United States Patent
Chen et al.

(10) Patent No.: US 8,411,284 B2
(45) Date of Patent: Apr. 2, 2013

(54) METHOD FOR SIMULTANEOUS HUE PHASE-SHIFTING AND SYSTEM FOR 3-D SURFACE PROFILOMETRY USING THE SAME

(75) Inventors: Liang-Chia Chen, Taipei County (TW); Yao-Sheng Shu, Tainan County (TW)

(73) Assignee: National Taipei University of Technology, Taipei (TW)

( * ) Notice: Subject to any disclaimer, the term of this patent is extended or adjusted under 35 U.S.C. 154(b) by 915 days.

(21) Appl. No.: 12/512,713

(22) Filed: Jul. 30, 2009

(65) Prior Publication Data

US 2010/0188400 A1 Jul. 29, 2010

(30) Foreign Application Priority Data

Jan. 23, 2009 (TW) ................................ 98102818 A

(51) Int. Cl.
*G01B 11/24* (2006.01)
(52) U.S. Cl. ........ 356/605; 356/618; 382/167; 348/241; 348/228.1
(58) Field of Classification Search .......... 356/601–623; 382/103, 154, 107, 236, 141, 286, 149, 167; 345/589, 690, 694, 419–420, 591; 348/241, 348/228.1, 229.1, 243
See application file for complete search history.

(56) References Cited

U.S. PATENT DOCUMENTS

| | | | |
|---|---|---|---|
| 6,438,272 B1 * | 8/2002 | Huang et al. | 382/286 |
| 6,788,210 B1 * | 9/2004 | Huang et al. | 340/612 |
| 7,092,105 B2 * | 8/2006 | Lim et al. | 356/601 |
| 7,189,984 B2 * | 3/2007 | Sawada | 250/559.07 |
| 7,456,842 B2 * | 11/2008 | Kosolapov | 345/589 |
| 2005/0073590 A1 * | 4/2005 | Mamiya | 348/222.1 |
| 2007/0206204 A1 * | 9/2007 | Jia et al. | 356/604 |
| 2010/0189372 A1 * | 7/2010 | Chen et al. | 382/260 |

OTHER PUBLICATIONS

Guan Congrong et al., RGB color G ray code based structured-light 3D measurement technique, Chinese Journal of Scientific Instrument, Apr. 30, 2007, P5/8-8/8, vol. 28, No. 4.

Zhang, Song et al., "High-Resolution, Real-Time 3D Shape Acquisition," Proceedings of the 2004 IEEE Computer Society Conference on Computer Vision and Pattern Recognition Workshops, 10 pgs (2004).

Huang, Peisen S. et al., "Color-Encoded Digital Fringe Projection Technique for High-Speed Three-Dimensional Surface Contouring," Opt. Eng. 38(6), pp. 1065-1075 (Jun. 1999).

* cited by examiner

*Primary Examiner* — Hoa Pham
(74) *Attorney, Agent, or Firm* — Morris Manning & Martin LLP; Tim Tingkang Xia, Esq.

(57) ABSTRACT

The present invention provides a method for simultaneous hue phase-shifting and a system for 3-D surface profilometry, wherein a single structured-light fringe pattern with encoded multiple trapezoidal color fringes is projected on an object so as to obtain a color image having deformed fringe patterns and then a hue information extracted from a HSI color model associated with the fringe pattern is transformed into a hue phase-shifting information for restructuring the 3-D surface profile of the object. Since the color structured light is composed of a plurality of colorful light having phase shifts with each other in spatial domain, the single structured-light pattern comprises multiple hue phase-shifting information so that the phase shifting and unwrapping can be performed by one-shot 3-D surface reconstruction process without needs of traditional conventional phase wrapping and Euler's transformation procedures such that the efficiency of phase shifting and 3-D surface measurement can be improved.

17 Claims, 19 Drawing Sheets

METHOD FOR SIMULTANEOUS HUE PHASE-SHIFTING AND SYSTEM FOR 3-D SURFACE PROFILOMETRY USING THE SAME

FIELD OF THE INVENTION

The present invention relates to a technique of phase-shifting method and profilometry system, and more particularly, to a method for simultaneous hue phase-shifting and system for 3-D profilometry for reconstructing the surface profile of the object according to the hue phase-shifting information transformed from the hue information.

BACKGROUND OF THE INVENTION

Currently, the research with respect to three-dimensional surface profilometry and reconstruction are mostly based on three-dimensional optical measurement methodology, which can be classified into two main categories including direct optical triangulation and phase measurement methods. The direct optical triangulation utilizes the triangulation measurement principle for obtaining the depth information with respect to the surface profile of an object through a geometrical triangulation calculation basing upon data obtained by optical spot scanning in a point-to-point manner. Although the triangulation measurement is simple to implement, it is generally time consuming and not capable of achieving high measurement accuracy. On the other hand, the phase shifting measurement method being designed to measure phase information for surface heights by evaluating a deformed grating image resulting from the projection of structured fringe patterns upon the surface of an object is capable of obtaining the 3-D profile of the object through the mapping of the measured phases with the heights. Comparing with the direct triangulation, the phase measurement operation not only can be performed much faster and with higher accuracy, but also can achieve full field measurement.

There are two major categories for phase measurement method that are most commonly seen in the field of applications, which are Fourier transform technique and phase shifting method. The Fourier transform profilometry (FTP) had already been well established and known to those skilled in the art and thus will not be described further herein. Similarly, the phase shifting method had been vastly studied and used in 3-D surface profilometry. In general, the phase shifting method generates a wrapped phase map according to the phase measurement of deformed fringe patterns onto the surface of the object. Since the phase is wrapped in the inverse trigonometric functions, the Euler's equation and phase unwrapping operation are taken to obtain the phase information with respect to the height of the surface of the object and thereby reconstructing the corresponding surface profile of the object. It is noted that the aforesaid phase shifting profilometry is a fast full-field measurement of high accuracy.

In a prior art disclosed in "High-resolution Real-time 3-D shape Acquisition", by Song Zhang and Peisen Huang at IEEE Computer Vision and Pattern Recognition Workshop, Vol. 03, No. 3, pp. 28-37, 2004, a high-resolution, real-time 3-D shape measurement system based on a digital fringe projection and phase-shifting technique is described. It utilizes a single-chip digital light processing projector to project three computer-generated fringe patterns having different phases that are shifted by $2\pi/3$ from each other onto the object, and a high-speed CCD camera synchronized with the projector to acquire the fringe images at a frame rate of 120 frames/s. A color CCD camera is also used to capture images for surface texture mapping. Based on a three-step phase-shifting technique, each frame of the 3-D shape is reconstructed using the three consecutive fringe images. With the system, together with the fast three-step phase-shifting algorithm and parallel processing software being developed, a real-time 3-D shape measurement is realized.

In addition, there is another prior art disclosed in "Color-encoded Digital Fringe Projection Technique for High-speed Three-dimensional Surface Contouring" by Peisen Huang et al, at Optical Engineering (38), No. 6, 1999, pp. 1065-1071. In this technique, a color fringe pattern with a sinusoidal intensity profile whose RGB components comprising three 120-degree phase-shifted fringe patterns is created by computer software and then projected to an object by a computer-controlled digital projection system. The image of the object is captured by a digital camera positioned at an angle different from that of the projection system. The image is then separated into its RGB components, creating three phase-shifted images of the object. These three images are then used to retrieve the 3-D surface contour of the object through the use of a phase wrapping and unwrapping algorithm. Only one image of the object is required to obtain the 3-D surface contour of the object. Thus contouring speed, limited only by the frame rate of the camera, can be dramatically increased as compared to that of other traditional phase-shifting techniques.

SUMMARY OF THE INVENTION

The present invention provides a method for simultaneous hue phase-shifting, which transforms a color image in traditional RGB coordinate system with deformed fringe patterns acquired by a RGB CCD into a hue image with respect to hue saturation intensity (HSI) coordinate system and converts the hue information extracted from the hue image into a hue phase-shifting information by an image processing process for minimizing the undesired effects of light intensity variation with respect to the color structured fringe light induced by various reflection factors on the surface of the object. Meanwhile, by means of the hue phase-shifting method of the present invention, it is capable of reconstructing the surface profile of the object by acquiring only one image so that the time spent for surface profilometry can be significantly reduced.

The present invention provides a method for simultaneous hue phase shifting, which compensates the error to overcome the potential RGB color shifts between the light source and image acquiring unit, or color coupling caused due to the spectrum overlapping problems of the light source component, namely red, green and blue lights.

The present invention provides a method for simultaneous hue phase-shifting and a system for 3-D surface profilometry, which projects a color structured light formed by RGB components (red, green, and blue) having spatial phase shifts with each other onto the object and acquires a color image with deformed fringe patterns having hue phase-shifting information with respect to the surface profile of the object. If the color of the object's surface consists all RGB components, a single color structured fringe pattern having multiple hue phase-shifting information can be projected onto the object. Then a hue phase shifting information can be transformed from the hue phase information being acquired and processed from the deformed fringe pattern on the measured object, thereby reconstructing the surface profile of the object. Since the color image is acquired only once, not only can it prevent undesired effects induced by environmental vibration, but also can it eliminate the time cost for phase wrapping, so that the efficiency of 3-D surface profilometry can be enhanced.

In an exemplary embodiment, the present invention provides a method for simultaneous hue phase-shifting comprising the steps of: projecting a color structured light onto an object; acquiring a reflected color fringe image having hue phase information with respect to the surface profile of the measured object; extracting hue information from the reflected color fringe image; and converting the hue information into hue phase-shifting information.

In another exemplary embodiment, the present invention provides a system for 3-D surface profilometry, comprising: a light source, for providing a color structured light; an image acquiring unit, for taking a color deformed fringe image having hue phase information with respect to the surface profile of the measured object; a processing unit, electrically connected to the light source and the image acquiring unit, for extracting hue information from the color deformed fringe image, and converting the hue information into a hue phase-shifting information.

Further scope of applicability of the present application can become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention can become more fully understood from the detailed description given herein below and the accompanying drawings which are given by way of illustration only, and thus are not limitative of the present invention and wherein.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the following.

A conventional color image is composed of three primary color light, i.e. red (R), green (G) and blue (B) with light intensity $I_r(x,y)$, $I_g(x,y)$, $I_b(x,y)$, ranging between a gray value of 0 and 255, respectively. For converting the image from the RGB coordinate system to the HSI (hue, saturation, and intensity) coordinate system, a normalization process is first performed to convert the hue with respect to the three primary colors such that the normalized hue value can be ranged between 0 and 1. Thereafter, defined hue ratios with respect to the three primary colors, R, G, and B, are calculated according to formula (1) and are represented as r, g, and b, respectively, wherein the values associated with r, g, and b are within a range of [0,1]. If R=G=B=1, the above hue ratios, r, g, and b, can be represented as formula (2).

$$r = \frac{R}{(R+G+B)}; g = \frac{G}{(R+G+B)}; b = \frac{B}{(R+G+B)} \quad (1)$$

$$r + g + b = 1 \quad (2)$$

Since the hue value with respect to the three primary colors ranges between [0,1], the light intensity can be further defined in formula (3) in the HSI coordinate system, wherein the light intensity I ranges between [0,1].

$$I = \frac{1}{3}(R+G+B) \quad (3)$$

Figure 1:
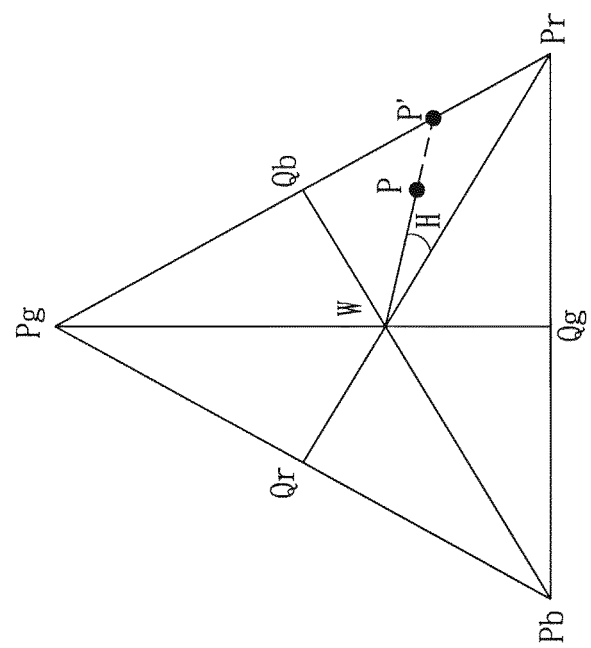
FIG. 1 is a schematic view of a HSI triangle model used in the present invention.

In order to obtain the hue and saturation with respect to the color image, it is necessary to define a HSI triangle model illustrated as FIG. 1 for describing the hue. The HSI triangle model satisfies the following conditions:

(a) The coordinate of the point W in the HSI triangle model is (⅓, ⅓, ⅓).
(b) The coordinate associated with an arbitrary point P in the HSI triangle model is represented as (r, g, b).
(c) Let $r_0 = R/I = 3R(R+G+B)$; $g_0 = G/I = 3G(R+G+B)$; and $b_0 = B/I = 3B(R+G+B)$, where I, as shown in formula (3), represents the light intensity of HSI. If $g_0 = b_0$, then the point $(r_0, g_0, b_0)$ lies on the $\overline{P_r Q_r}$. Similarly, if $r_0 = g_0$, then the point $(r_0, g_0, b_0)$ lies on the $\overline{P_b Q_b}$ while if $r_0 = b_0$, then the point $(r_0, g_0, b_0)$ lies on the $\overline{P_g Q_g}$. Moreover, for i=r, g, or b, then $\overline{W_i Q_i}/\overline{P_i Q_i} = 1/3$ and $\overline{W_i P_i}/\overline{P_i Q_i} = 2/3$.

Figure 2:
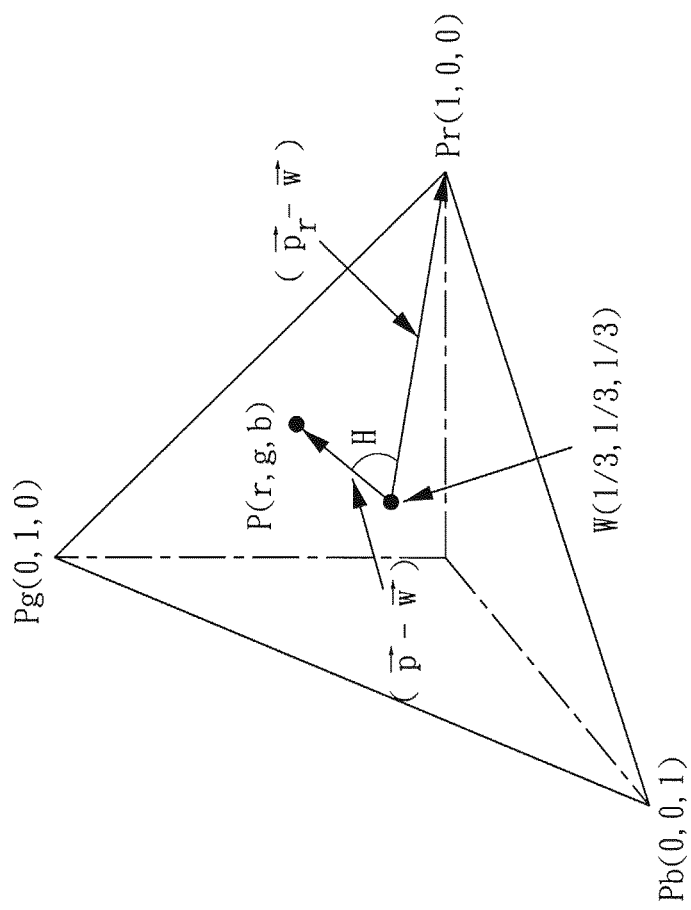
FIG. 2 is a three-dimensional diagram of a HSI triangle model used in the present invention

According to the illustration shown in FIG. 2, the hue can be represented as the included angle between the vector $(\vec{P_r} - \vec{W})$ and vector $(\vec{P} - \vec{W})$, while the saturation is substantially a distance from an arbitrary point P to W(⅓, ⅓, ⅓). Accordingly, a formula associated with the term of cos H can be represented as formula (4).

$$\cos H = \frac{(\vec{p} - \vec{w}) \cdot (\vec{p_r} - \vec{w})}{\|\vec{p} - \vec{w}\| \times \|\vec{p_r} - \vec{w}\|} \quad (4)$$

Assuming that a vector a comprises three components of $a_1$, $a_2$, and $a_3$, the length corresponding to the vector $\vec{a}$ can be represented as formula (5).

$$\|\vec{a}\| = [a_1^2 + a_2^2 + a_3^2]^{1/2} \quad (5)$$

According to the foregoing condition (a) and (b) defined in [0034] and formula (5), $\|\vec{p} - \vec{w}\|$ can be represented as formula (6).

$$\|\vec{p} - \vec{w}\| = \left[\left(r - \frac{1}{3}\right)^2 + \left(g - \frac{1}{3}\right)^2 + \left(b - \frac{1}{3}\right)^2\right]^{1/2} \quad (6)$$

Then, formula (1) is substituted for r, g, and b in formula (6) so as to derive formula (7) shown as below.

$$\|\vec{p} - \vec{w}\| = \left[\frac{9(R^2 + G^2 + B^2) - 3(R + G + B)^2}{9(R + G + B)^2}\right]^{1/2} \quad (7)$$

Meanwhile, the length of a vector formed by $\vec{p_r}(1, 0, 0)$ and w(⅓, ⅓, ⅓) is represented as formula (8).

$$\|\vec{p_r} - \vec{w}\| = \left(\frac{2}{3}\right)^{1/2} \quad (8)$$

On the other hand, the result of vector dot product with respect to the vector i and j can be represented as formula (9).

$$i \cdot j = i^T j = i_1 j_1 + i_2 j_2 + i_3 j_3 \quad (9)$$

According to formula (9), the term of $(\vec{p} - \vec{w}) \cdot (\vec{p_r} - \vec{w})$ in formula (4) can be regarded as the vector dot product, which can be derived by substituting R, G, and B for r, g, and b, respectively, according to formula (1) such that the term, $(\vec{p} - \vec{w}) \cdot (\vec{p_r} - \vec{w})$, can be represented as formula (10).

$$(\vec{p} - \vec{w}) \cdot (\vec{p_r} - \vec{w}) = \left(r - \frac{1}{3}, g - \frac{1}{3}, b - \frac{1}{3}\right) \cdot \left(\frac{2}{3}, -\frac{1}{3}, -\frac{1}{3}\right) \quad (10)$$

$$= \frac{2}{3}\left(r - \frac{1}{3}\right) - \frac{1}{3}\left(g - \frac{1}{3}\right) - \frac{1}{3}\left(b - \frac{1}{3}\right)$$

$$= \frac{2R - G - B}{3(R + G + B)}$$

As a result, formula (7), (8), and (10) are substituted for the formula (4) so as to create formula (11) representing the hue (H) after simplification.

$$H = \cos^{-1}\left\{\frac{\frac{1}{2}[(R - G) + (R + B)]}{[(R - G)^2 + (R - B)(G - B)]^{1/2}}\right\} \quad (11)$$

However, the value of H (hue) obtained by arccosine computation ranges between [0, π]. Therefore, to obtain a complete hue distribution within range between [0, 2π], formula (12) should be considered while calculating the formula (11).

$$H = \begin{cases} H, & \text{if } b < g \\ 2\pi - H, & \text{if } b \geq g; \end{cases} \quad (12)$$

Accordingly, a complete equation with respect to the H (hue) can be represented as formula (13).

$$H = \cos^{-1}\left\{\frac{\frac{1}{2}[(R - G) + (R + B)]}{[(R - G)^2 + (R - B)(G - B)]^{1/2}}\right\} \quad (13)$$

$$H = \begin{cases} H, & \text{if } b < g \\ 2\pi - H, & \text{if } b \geq g; \end{cases}$$

It is noted that all the aforesaid formulas are explaining a way how to extract hue information from a color image. In regard to the profilometry for reconstructing the surface profile of an object by means of the hue information, it will be described hereinafter.

Figure 3:
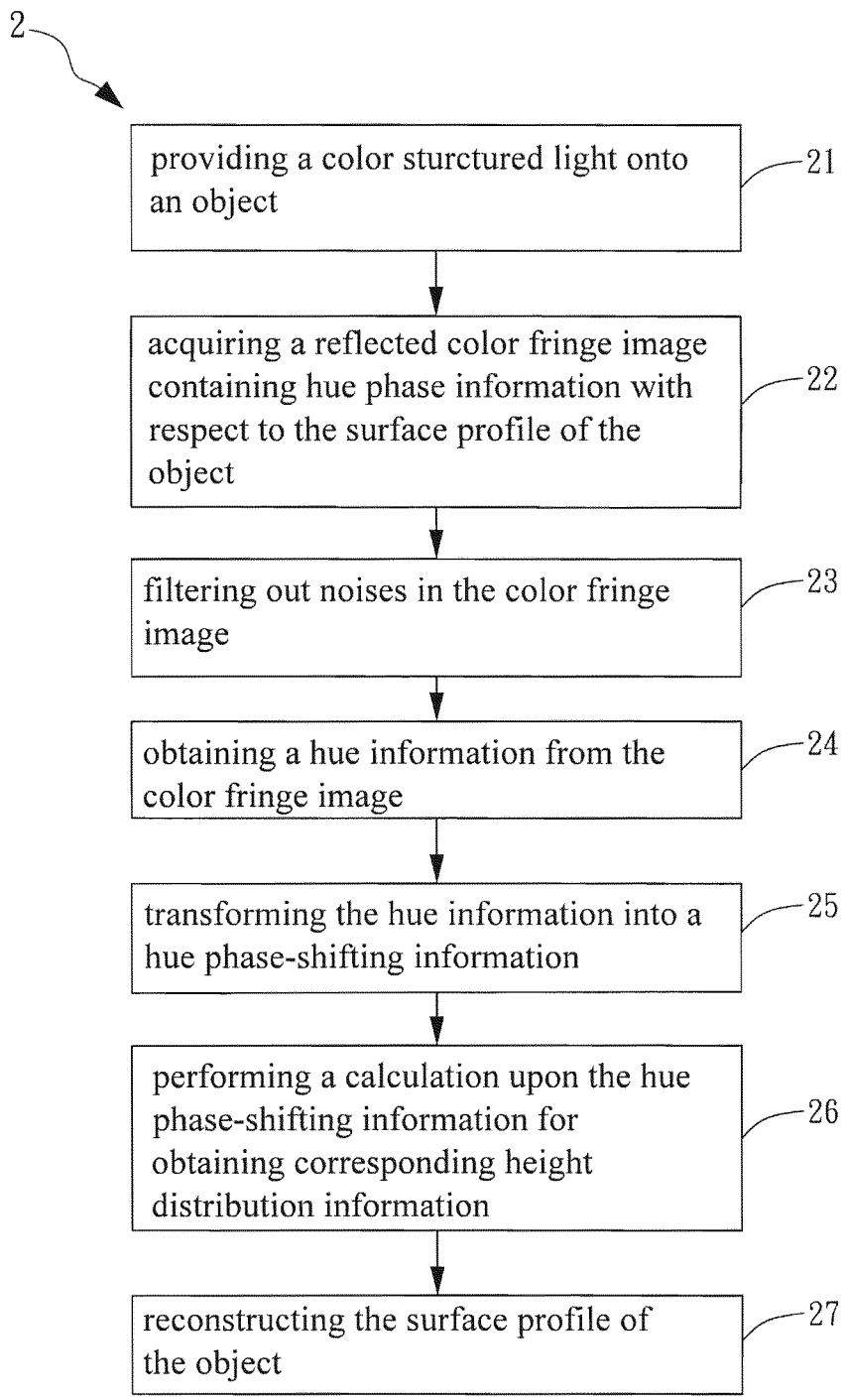
FIG. 3 is an embodiment of a flow chart illustrating the steps of a method for simultaneous hue phase-shifting according to the present invention.
Figure 4A:
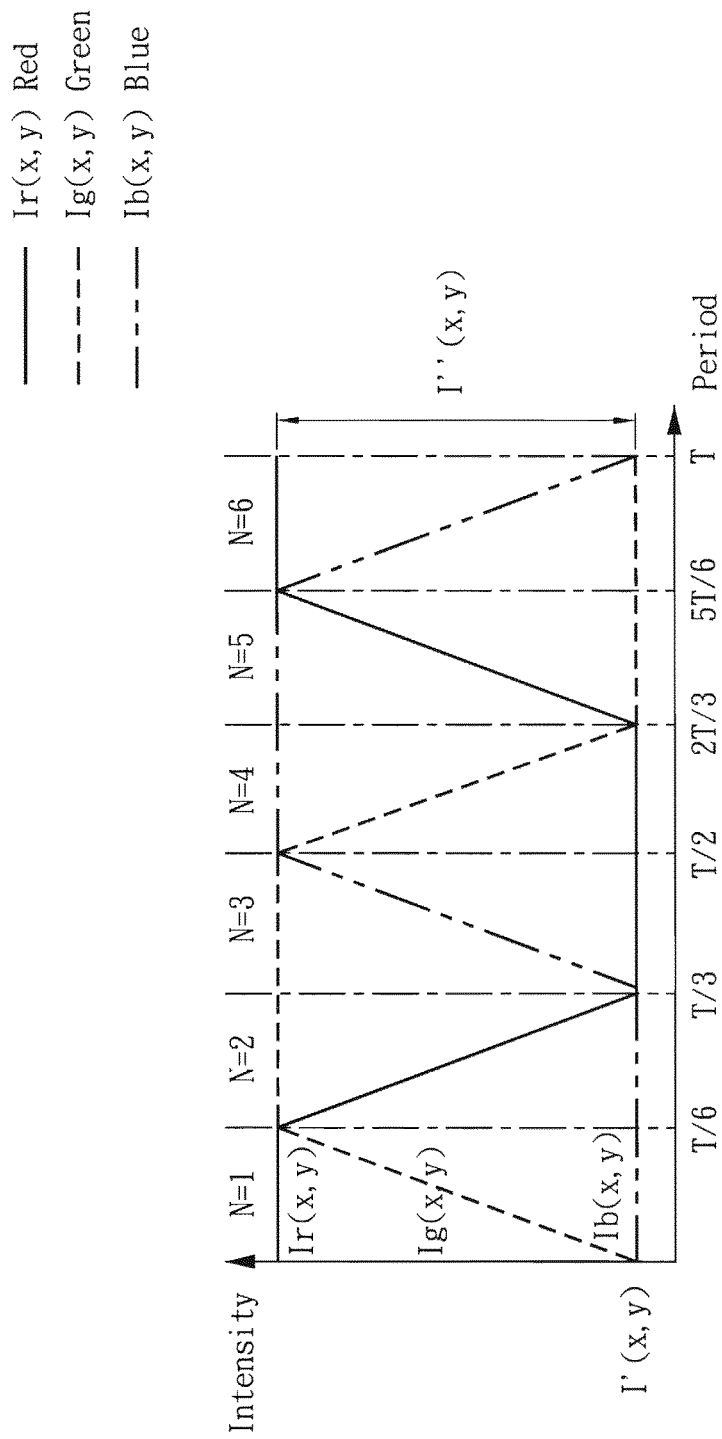
FIG. 4A is a schematic diagram showing a color structured-light intensity pattern encoded with trapezoidal color fringes with encoded phase shifts according to the present invention.
Figure 4B:
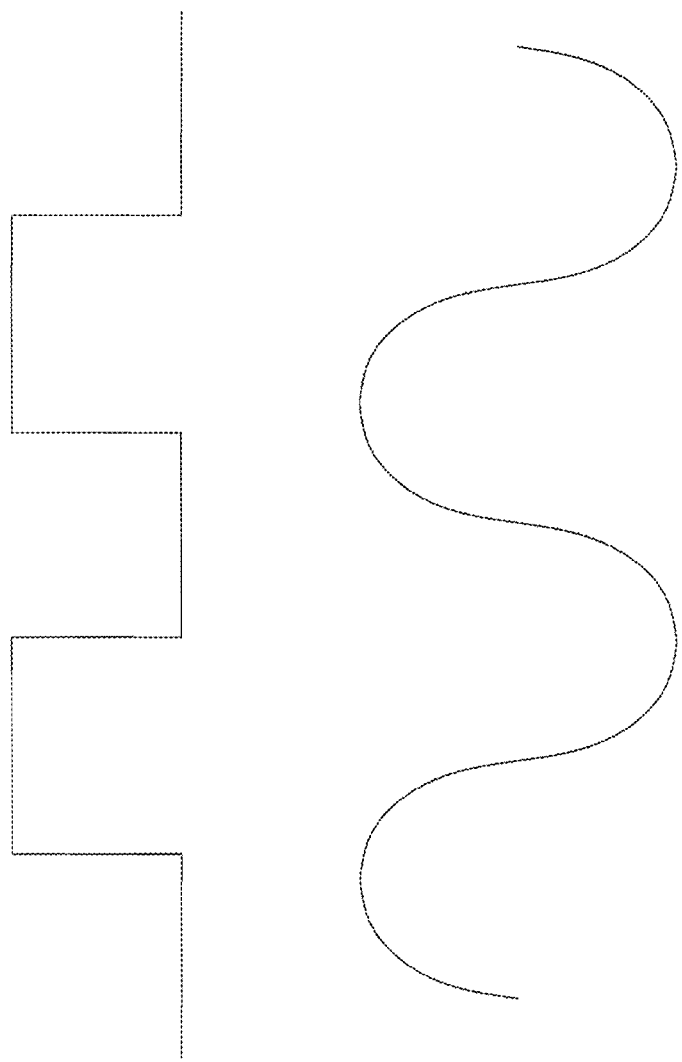
FIG. 4B is schematic diagram showing color structured light patterns encoded with different intensity profiles according to the present invention.
Figure 4D:
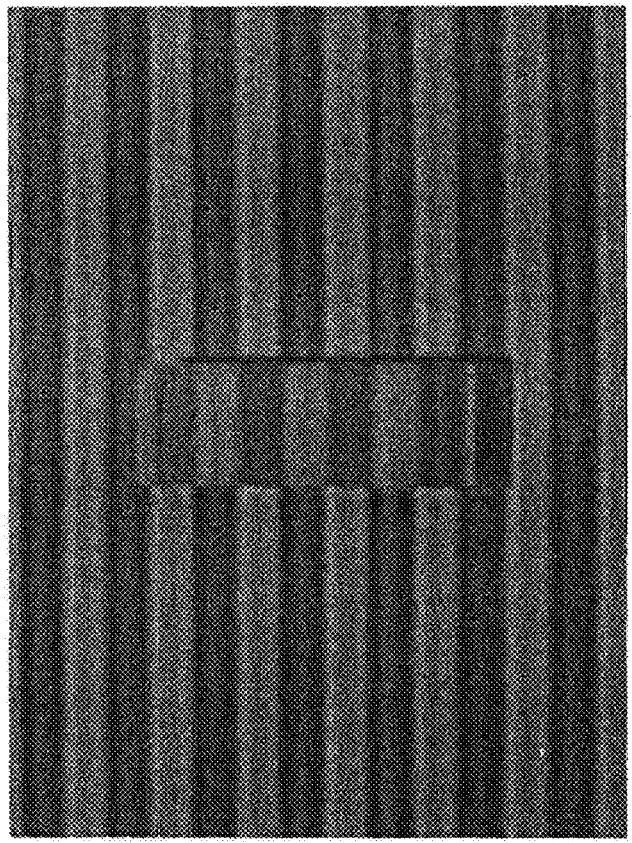
FIG. 4D is a schematic diagram showing a color deformed fringe image relating to the surface profile of an object resulting from the projection of a color structured light pattern of the present invention.
Figure 4C:
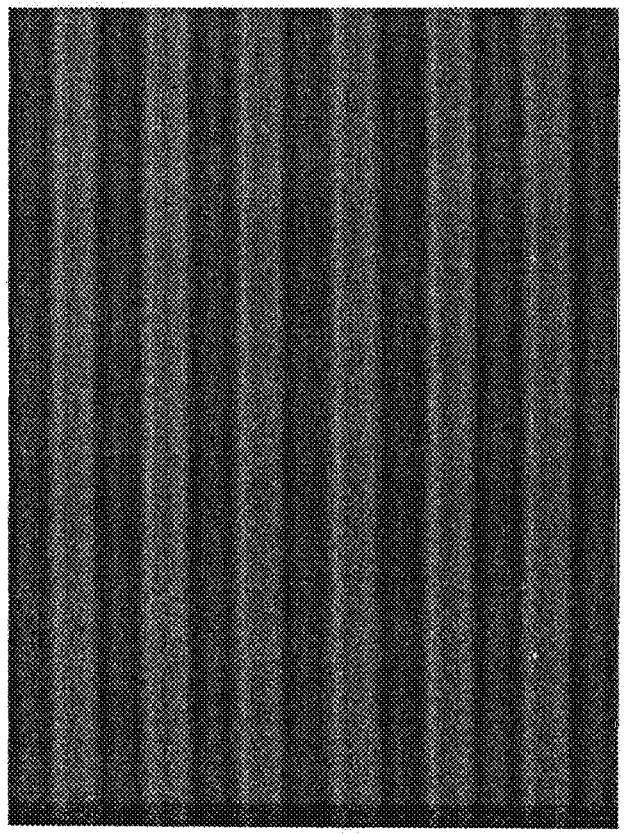
FIG. 4C is a schematic diagram showing a color fringe pattern projected from a light source in an embodiment of the present invention.

Please refer to FIG. 3, which is an embodiment of a flow chart depicting the steps of a method for simultaneous hue phase-shifting according to the present invention. The flow 2 starts from step 21. At step 21, a color structured light is projected onto an object. The color structured light has trapezoidal fringe patterns formed by red (R), green (G), and blue (B) primary color lights, respectively, wherein each of the two primary color lights have a spatial phase difference therebetween. Each of the primary color light has a continuous hue variation so that the color structured light has the continuous hue variation. The so-called continuous hue variation, taking the primary red color light for explaining, means that the primary red light has the gradient color varying from deep red to light red rather than has monochromatic hue intensity. Please refer to FIG. 4A, which illustrates the phase difference between the two primary color lights. In the present invention, the phase difference between each of the two primary color lights can be 2π/3, but should not be limited to this. For example, as shown in FIG. 4A, a continuous color structured light generated according to formula (14) to (16) representing the R, G, and B primary color light $I_r(x,y)$, $I_g(x,y)$, and $I_b(x,y)$, respectively, has a trapezoidal waveform with a spatial period of 2π/3 while the phase difference between any two of the primary color light is also 2π/3, wherein I'(x,y) represents the direct (background) component of the color structured light, which is 0 conventionally, as well as the I"(x,y) represents the modulation amplitude of the color structured light, also regarded as the amplitude, of the color structured light. In addition to the trapezoidal waveform, the waveform of the color structured light can include, but should not be limited to, sinusoidal waveforms or square waveforms, which are shown in FIG. 4B. The color structured light generated in step 20 is illustrated in the FIG. 4C.

$$I_r(x, y) = \begin{cases} I'(x, y) + I''(x, y); & x \in [0, T/6) \text{ or } [5T/6, T) \\ I'(x, y) + I''(x, y)(2 - 6x/T); & x \in [T/6, T/3) \\ I'(x, y); & x \in [T/3, 2T/3) \\ I'(x, y) + I''(x, y)(6x/T - 4); & x \in [2T/3, 5T/6) \end{cases} \quad (14)$$

$$I_g(x, y) = \begin{cases} I'(x, y) + I''(x, y)(6x/T); & x \in [0, T/6) \\ I'(x, y) + I''(x, y); & x \in [T/6, T/2) \\ I'(x, y) + I''(x, y)(4 - 6x/T); & x \in [T/3, 2T/3) \\ I'(x, y); & x[2T/3, T) \end{cases} \quad (15)$$

$$I_b(x, y) = \begin{cases} I'(x, y); & x \in [0, T/3) \\ I'(x, y) + I''(x, y)(6x/T - 2); & x \in [T/3, T/2) \\ I'(x, y) + I''(x, y); & x \in [T/2, 5T/6) \\ I'(x, y) + I''(x, y)(6 - 6x/T); & x \in [5T/6, T) \end{cases} \quad (16)$$

Conventionally, the accuracy of the surface profilometer is adversely affected and reduced by many nonlinear errors, which can be divided into two major factors including the errors caused by the image acquiring unit such as RGB CCD, and the errors caused by potential variance or noises of the light source, such as DLP (digital light processing) projectors. Since the color structured light is employed in the present invention, the capability with respect to the light source for providing high color precision and an image acquiring unit for capturing the image with precise color is essential. However, there exists color shifting and color coupling problems encountered in the DLP projector, and the color spectrum distribution of the image captured by the RGB CCD may be affected due to various different sensitivity corresponding to the R, G, and B color filters while detecting the RGB primary color lights. Moreover, the degree of color diffusion or absorption are different with respect to different surfaces of an object, so the reflected light of the projected color structured light on a tested object may be affected such that some light spectrum component within the color structured light might be decayed whereas some might be reflected better so that the nonlinear errors may be induced during the process of converting the color image from the RGB coordinate system into the HSI coordinate system for performing the trapezoidal phase shifting, and thus the profile measured error may be occurred after reconstructing the three-dimensional surface profile of the object.

Figure 5A:
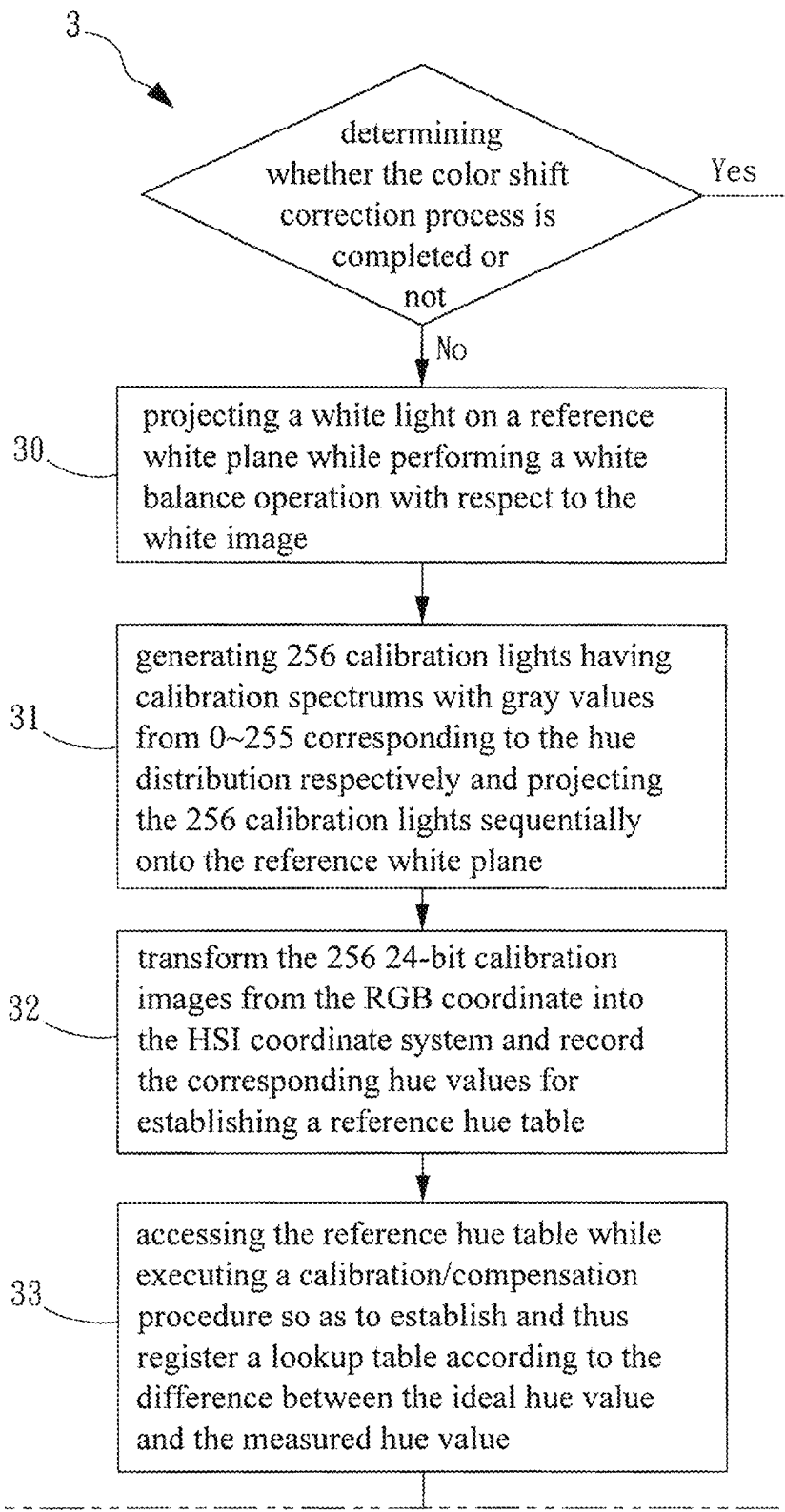
FIG. 5 is an embodiment of a flow chart depicting steps of a color hue phase-shifting correction process used in the present invention.
Figure 5B:
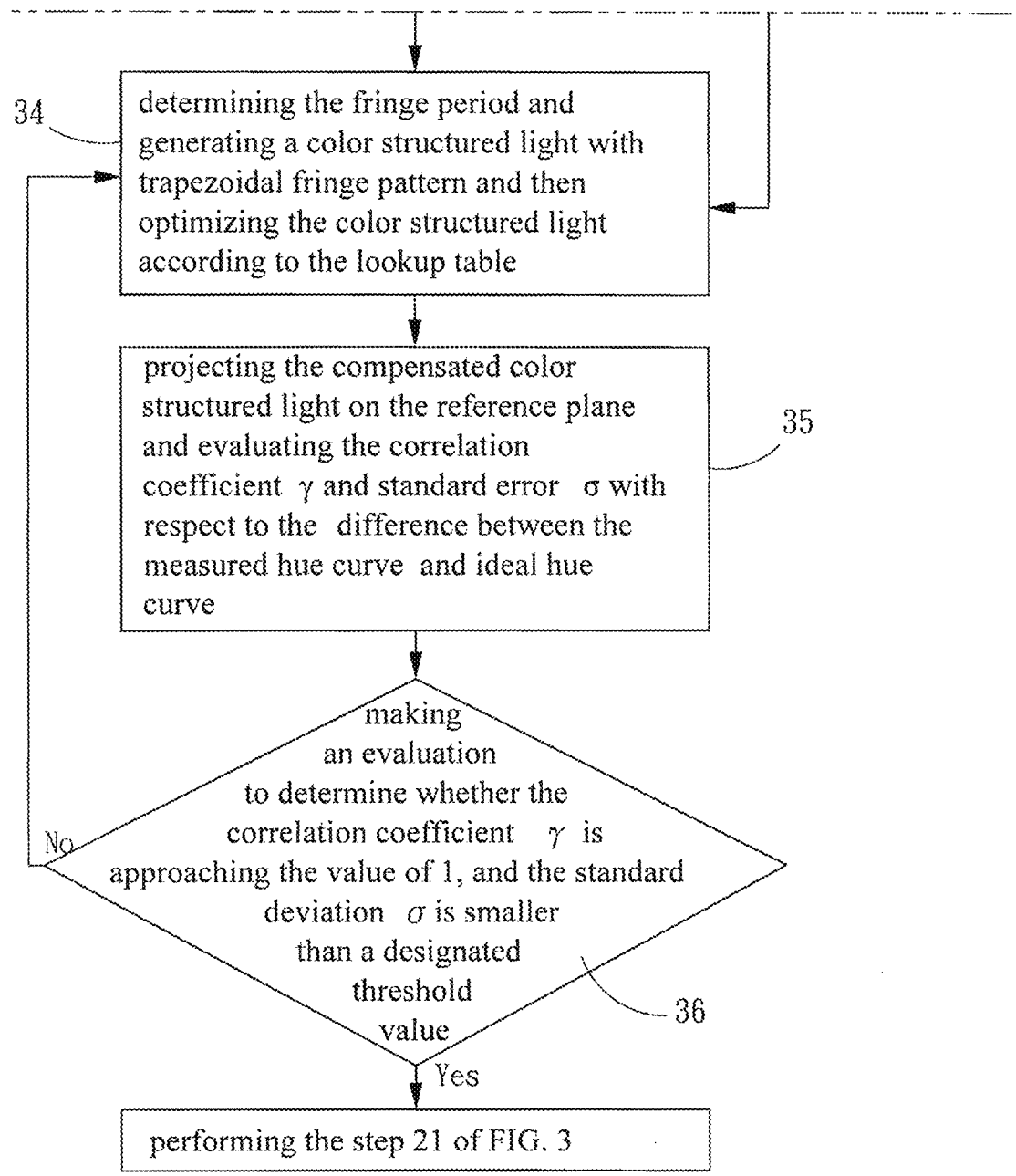

In regard to the foregoing problem, a color shift calibrating method is provided in the present invention, which is capable of generating a color structured light appropriately with respect to the degree of surface color diffusion and absorption of the object having different kinds of surface colors. Please refer to FIG. 5, which illustrates an embodiment of a flow chart for calibrating the color shift in the present invention. In the flow shown in FIG. 5, it functions to calibrate and compensate the color shift with respect to the color structured light generated in step 21. The flow 3 starts from step 30 for generating a white calibrating light having hue, saturation, and intensity of (255, 255, 255) onto a reference plane having the standard white surface. Then the image acquiring unit, which is a RGB CCD in the present embodiment, performs a procedure of auto white balance (AWB) with respect to the white image captured from the reference plane such that the intensity corresponding to the red, green, and blue primary lights are the same, respectively. It is noted that the purpose of step 30 is to match the color temperature between the RGB CCD and the measuring environment where the reference plane exists so as to eliminate potential problem in intensity variances between the three primary colors.

After that step 31 is performed to generate a series of 256 calibrated lights having calibration spectrums with gray levels from 0 to 255 corresponding to the hue distribution, respectively, and to project the 256 calibrated lights sequentially onto the reference white plane by a light source such as a DLP projector used as a color light generator and capture the corresponding calibrated images simultaneously. Afterward, step 32 is performed to transform the 256 24-bit calibrated images from RGB coordinate into HSI coordinate system and record the corresponding hue values for establishing a reference hue table associated with a relationship between the ideal hue values associated with the projected calibration lights and the measured hue values with respect to the calibration spectrums. In order to obtain the measured hue values objectively, it is noted that step 32 can be operated a plurality of times so as to obtain a plurality of sets of the measured hue values and then an average computation with respect to the plurality of sets of the measured hue values is performed thereby obtaining a set of the average measured hue values corresponding to the ideal hue values such that an objective reference hue table can be established.

Figure 6:
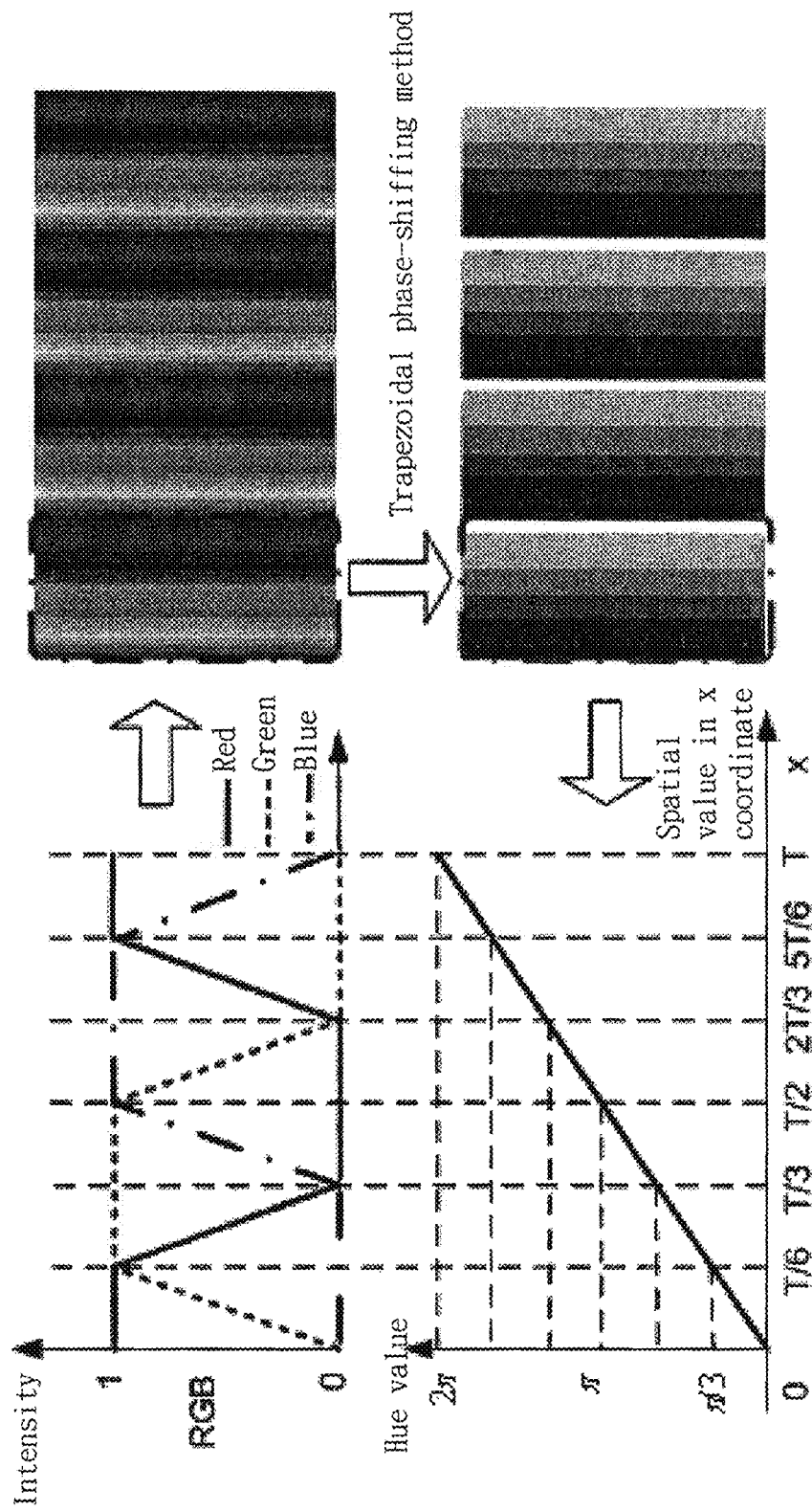
FIG. 6 shows the relationship between a color structured light pattern encoded with RGB trapezoidal fringes with encoded phase shifts and its corresponding hue value.

At step 33, a calibration program is executed to access the reference hue table and then a lookup table is registered after performing the calibrating and compensating process according to the difference between the ideal hue value and the measured hue value in the reference hue table. After that, step 34 is performed to determine the desired period and generate a color structured light with a trapezoidal fringe pattern and then optimize the color structured light according to the lookup table. In step 34, in order to generate the color structured light having a continuous and linear hue distribution within [0,2π], the light intensity distribution of the color structured light is described as formula (17), which is derived according to formula (14)~(16), and the relationship between the transformed HSI coordinate system and the period with respect to the color structured light are illustrated as FIG. 6. FIG. 6 illustrates the hue distribution with respect to the color structured light having a trapezoidal fringe pattern ranging between [0, 2π], which is divided into six equal parts with a symmetrically distributed spatial span and the same slope as each other. In formula (17), the intensities associated with the R, G, and B primary lights are defined as: R=1; G=6x/T; B=0; when x∈[0,T/6), respectively. Substituting the aforesaid R, G, and B into formula (11) and the hue can be simplified to formula (18):

$$I_r(x, y) = \begin{cases} 1 & x \in [0, T/6) \text{ or } [5T/6, T) \\ (2 - 6x/T) & x \in [T/6, T/3) \\ 0 & x \in [T/3, 2T/3) \\ (6x/T - 4); & x \in [2T/3, 5T/6) \end{cases} \quad (17)$$

$$I_g(x, y) = \begin{cases} (6x/T) & x \in [0, T/6) \\ 1 & x \in [T/6, T/2) \\ (4 - 6x/T) & x \in [T/3, 2T/3) \\ 0 & x \in [2T/3, T) \end{cases}$$

$$I_b(x, y) = \begin{cases} 0 & x \in [0, T/3) \\ (6x/T - 2) & x \in [T/3, T/2) \\ 1 & x \in [T/2, 5T/6) \\ (6 - 6x/T) & x \in [5T/6, T) \end{cases}$$

$$H = \cos^{-1}\left\{\frac{\frac{1}{2}\left[\left(1-\frac{6x}{T}\right)+1\right]}{\left[\left(1-\frac{6x}{T}\right)^2+\frac{6x}{T}\right]^{1/2}}\right\} \quad (18)$$

$$= \cos^{-1}\left\{\frac{1-\frac{\left(\frac{6x}{T}\right)}{2}}{\left[\left(\frac{6x}{T}\right)^2-\frac{6x}{T}+1\right]^{1/2}}\right\}$$

$$\approx \cos^{-1}\left\{1-\frac{\left(\frac{\pi}{3}\frac{6x}{T}\right)^2}{2}\right\}$$

Then, the cosine part of the formula (18) can be expressed as formula (19), shown as below, by the Taylor series expansion.

$$\cos(x) = \frac{d}{dx}\sin x = 1 - \frac{x^2}{2!} + \frac{x^4}{4!} - \frac{x^6}{6!} + \ldots = \sum_{n=0}^{\infty}\frac{x^{2n}}{(2n)!} \quad (19)$$

If the only first two terms of Taylor expansion (19) are kept, the cosine part of formula (19) can be simplified to formula (20).

$$\cos(x) = 1 - \frac{x^2}{2!} \Leftrightarrow x = \cos^{-1}\left(1-\frac{x^2}{2!}\right) \quad (20)$$

Comparing formula (18) and (20), it is noted that 1 and $$\left(\frac{\pi}{3}\frac{6x}{T}\right)$$

are the first term and the second term of the Taylor expansion (19), respectively, so that formula (18) can be further simplified to formula (21).

$$H \approx \frac{\pi}{3}\frac{6x}{T} \quad (21)$$

Figure 7A:
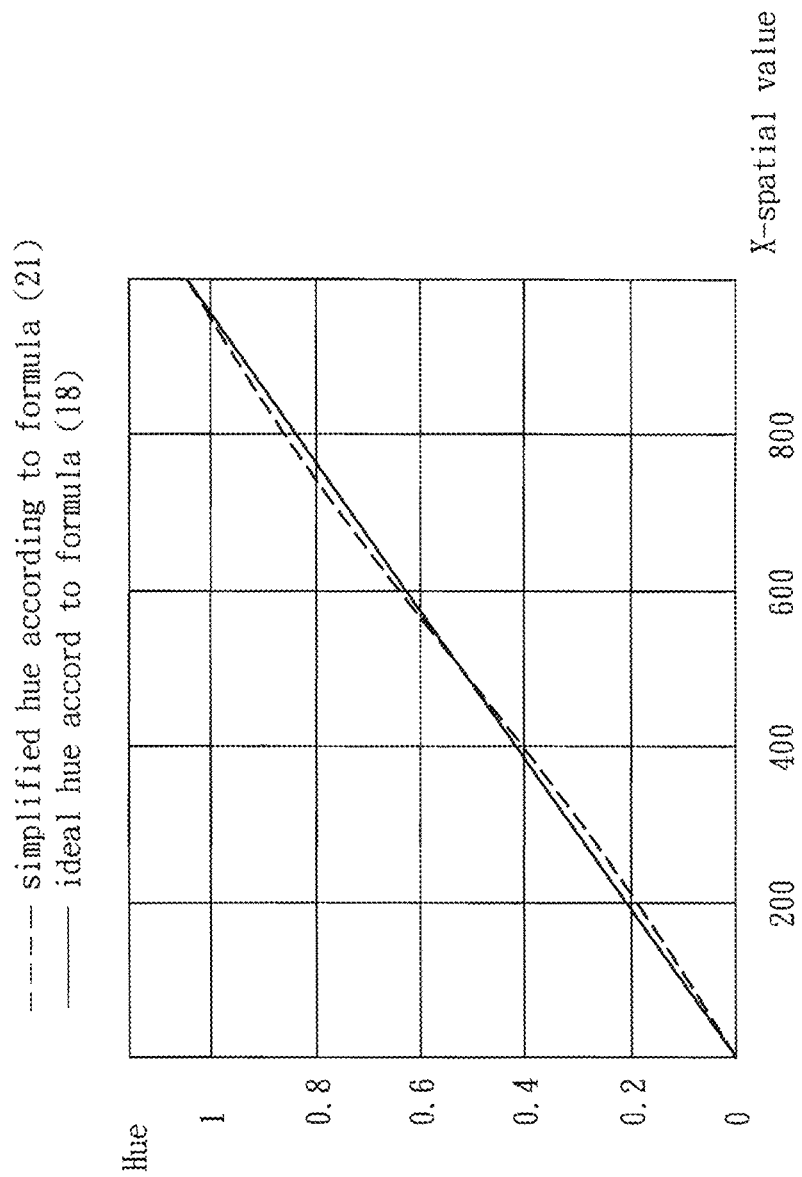
FIG. 7A is a diagram showing a relation between the measured hue curve and the ideal hue curve with respect to the color structured light with RGB trapezoidal fringe patterns.
Figure 7B:
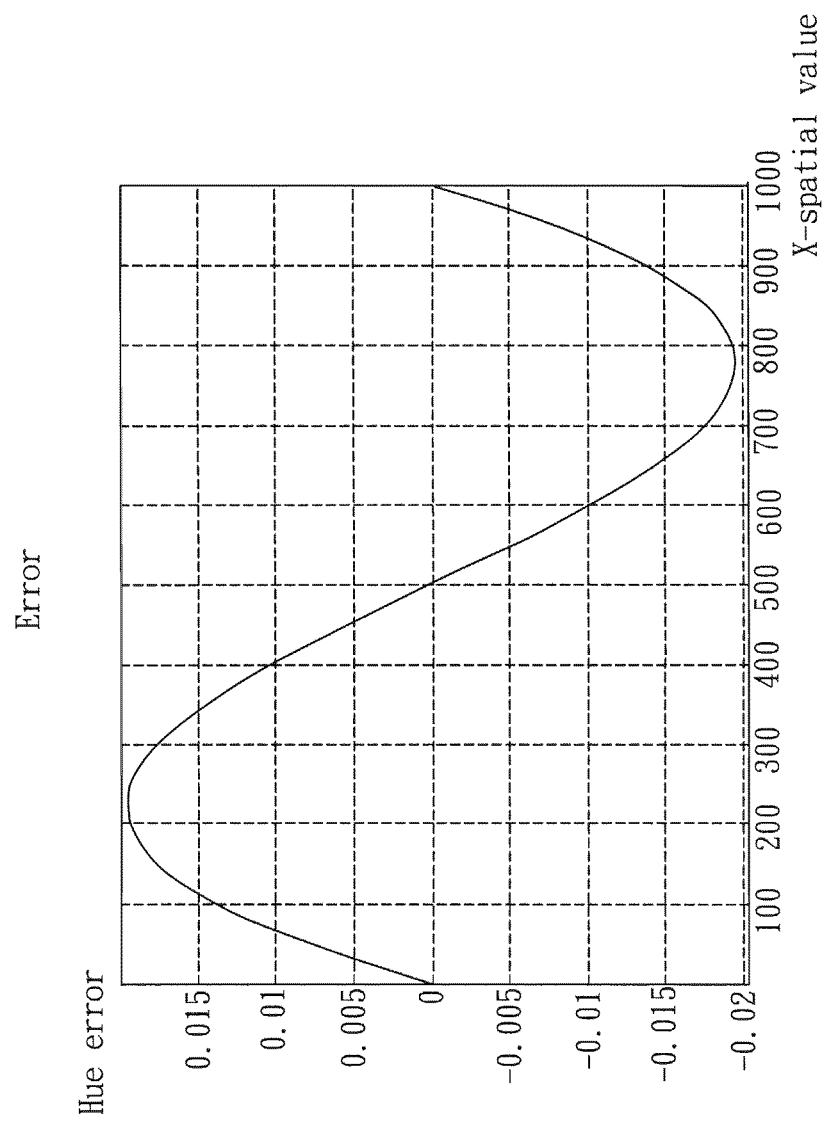
FIG. 7B is a diagram showing differences between the measured hue curve and the ideal hue curve shown in FIG. 7A.
Figure 7C:
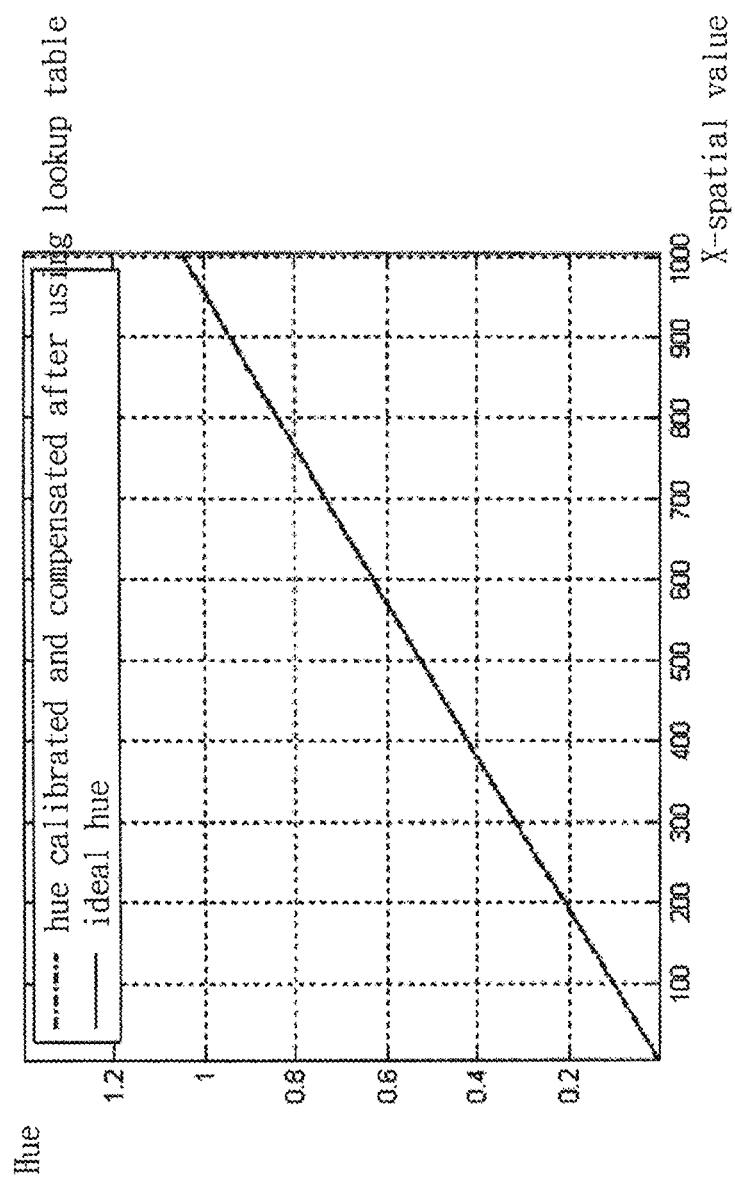
FIG. 7C is a diagram depicting the ideal hue curve and the measured hue curve after being compensated according to the lookup table with respect to the color structured light.

In step 34, the ideal hue with respect to formula (18) and the hue simplified by the Taylor series expansion with respect to formula (21), can be illustrated in FIG. 7A by the software calculation such as Matlab. It is noted that there exists a nonlinear difference between the ideal hue and the simplified hue after transforming the color structured light having the trapezoidal fringe pattern into the HSI coordinate system, which is shown in FIG. 7B. The difference can be calculated and compensated by referring to the lookup table being established in step 33. The result of calibration and compensation is illustrated as FIG. 7C, which illustrates that the difference can be satisfactorily eliminated by the above proposed algorithm of calibration and compensation. Please refer back to the FIG. 5, finally, a step 35 is performed to project the compensated color structured light on the reference plane and evaluate the correlation coefficient γ and standard error σ with respect to the difference between the measured hue curve with respect to the compensated structured light and ideal hue curve. Afterward, step 36 is performed to determine whether the correlation coefficient γ is approaching the value of 1 or not, and the standard deviation σ is smaller than a designated threshold value, i.e. a specific gray level. If so, the ratio of the color shifting caused by the light source and the total grey level (0~255) is considered to be acceptable. In this stage, the calibration and compensation process is completed for generating the calibrated color structured light in which hue value is linear to the spatial displacement (X) along one direction in space, and thus the flow proceeds to flow 2 illustrated as FIG. 3; otherwise, the flow proceeds back to step 34.

Figure 4E:
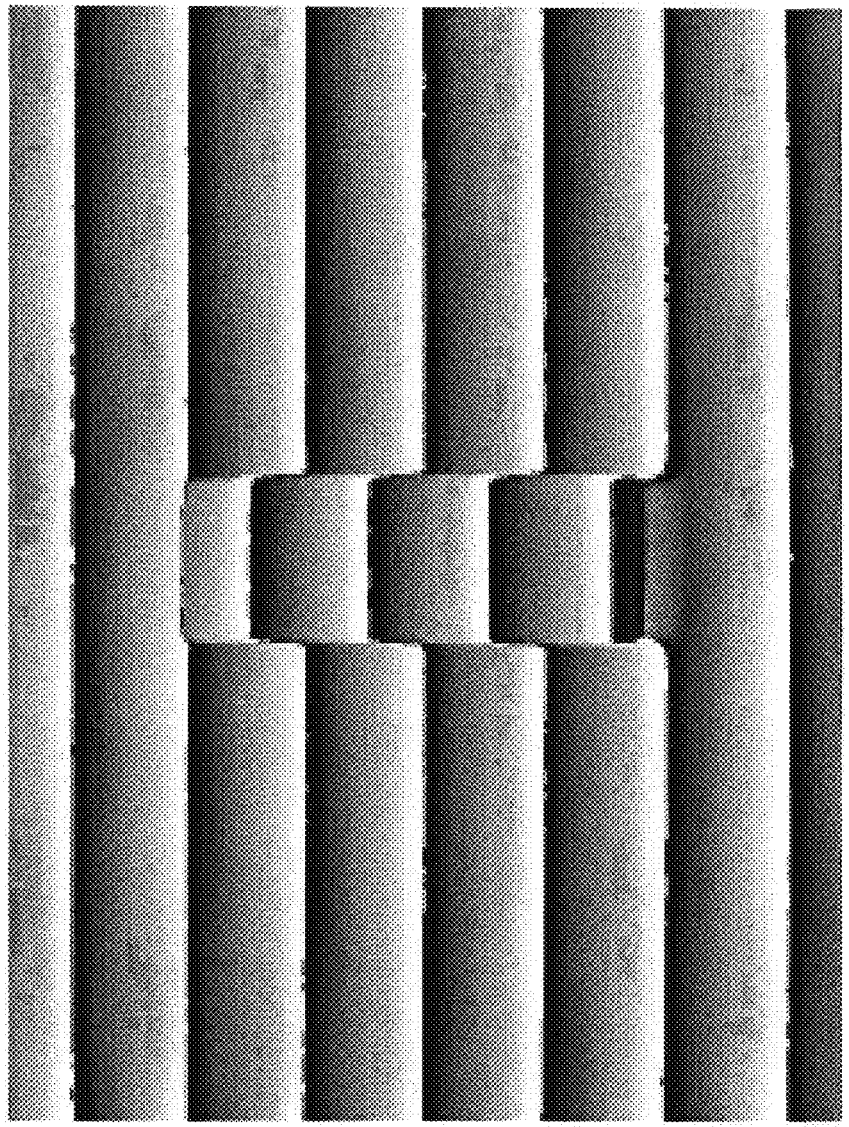
FIG. 4E is a wrapped phase image produced by transforming the color structured fringe image from its conventional RGB coordinate system into the HSI coordinate system.

If the correlation coefficient γ and standard error σ satisfy the condition described in step 36, the calibrated color structured light is projected onto the object. In the embodiment, the surface color of the object is composed by the three primary colors, wherein the object in the present invention may be, but should not be limited to, a calibration tool, testing object, or the supporting platform. Afterward, step 22 is performed to acquire a reflected color fringe image having corresponding hue phase information with respect to the surface profile of the object being projected by the color structured light. It is noted that since the color structured light is projected on the object's surface, the reflected light from the tested surface may have various optical path difference (OPD) according to the surface profile variation; therefore, the reflected color structured light pattern is distorted thereby the hue phase shift with respect to the surface profile of the object is occurred so as to form the reflected color fringe image with deformed fringe patterns, which is illustrated as FIG. 4D. At step 23, a process is performed for eliminating the noises in the reflected color fringe image, and then the flow proceeds to step 24. Generally, the noise eliminating process is performed by the use of a low-pass filter or band-pass filter for eliminating the high-frequency noises. At step 24, the hue phase-shifting information is extracted from the distorted color fringe image taken by an image acquiring unit. The performing of the step 24 is to converting the single reflected color fringe image from its conventional RGB coordinate system into its HSI coordinate system, which is illustrated as FIG. 4E. Then the hue information can be obtained according to formula (13), which is derived previously and thus will not be described further hereinafter.

At step 25, the hue information is transformed into the hue phase-shifting information; and then the flow proceeds to step 26. Please refer to FIG. 8, which illustrates the drawing for explaining the hue phase-shifting information. According to FIG. 8, the optic axis center of a light source 90 for emitting a color structured light is disposed at a distance d away from the optic axis center of an image acquiring unit 91 for capturing the reflected color fringe image while a reference plane 92 is disposed at a vertical distance l away from the light source 90 and the image acquiring unit 91. Assuming the projecting point of the light source 90 and the image capturing point of the image acquiring device 91 is intersected at the point O with a height of h. Since the fringe pattern of the color structured light from the light source 90 is distorted according to the OPD of the tested surface profile and the hue phase is shifted. Assuming that the fringe pattern is distorted from point C to the point D, the line $\overline{CD}$ can be regarded as the hue phase-shifting information ΔH in the HSI coordinate system.

Figure 8:
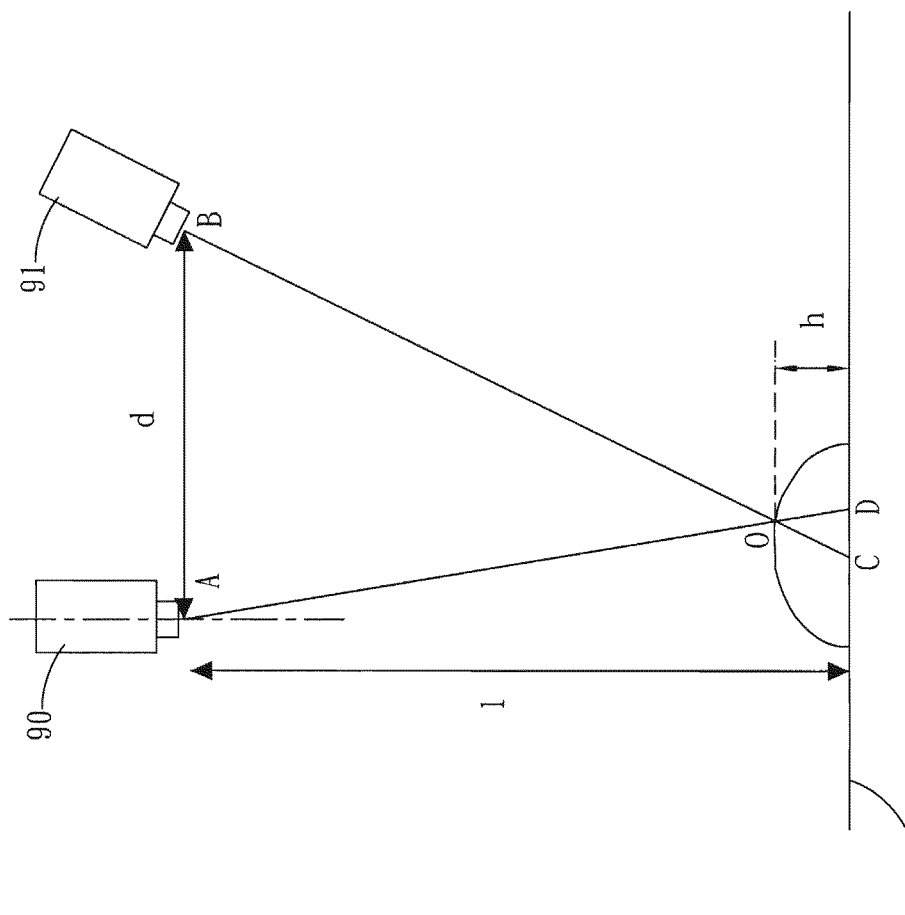
FIG. 8 is a schematic optical measurement configuration used for illustrating the hue phase-shifting method in the present invention.

In FIG. 8, ΔOCD and ΔOBA are two triangles similar to each other, so the formula (22) can be derived as follows:

$$\frac{h}{\overline{CD}} = \frac{1-h}{d} = \frac{1}{\overline{CD}+d} \quad (22)$$

Then, formula (23) with respect to h can be derived by simplifying formula (22).

$$h = \frac{\overline{CD}\, l}{\overline{CD} + d} \quad (23)$$

Therefore, the relationship between $\overline{CD}$ and the hue phase-shifting information $\Delta H$ can be shown as formula (24), wherein $P_0$ and $f_0$ are respectively the period length and frequency of the color structured light in spatial domain; H and $\Delta H$ are respectively period of hue information and corresponding hue phase-shifting information in the reflected color fringe image with unit of pixels.

$$\frac{\overline{CD}}{P_0} = \frac{\Delta H}{H} \rightarrow \Delta H = H\frac{\overline{CD}}{P_0} = Hf_0\overline{CD} \quad (24)$$

Figure 4G:
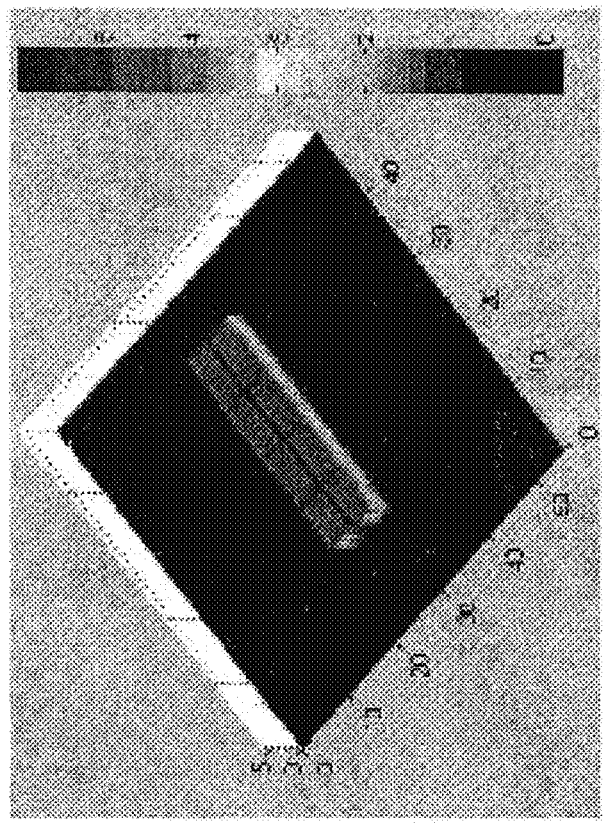
FIG. 4G shows a reconstructed 3-D surface profile of the object.
Figure 4F:
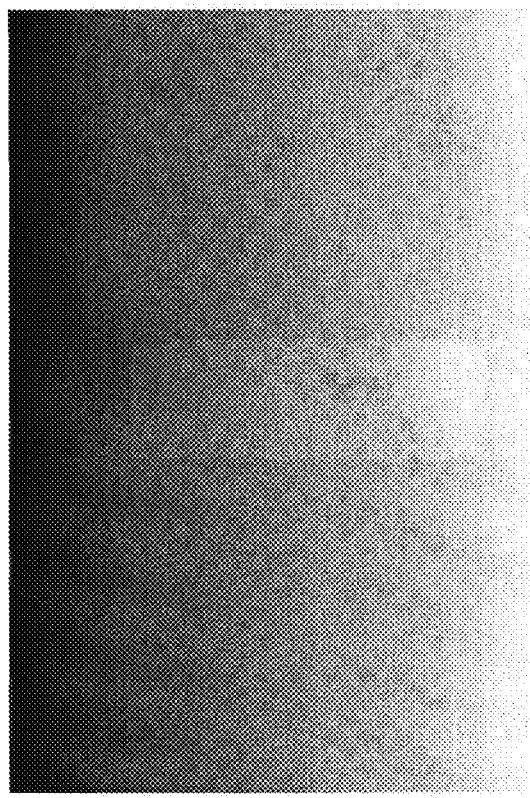
FIG. 4F is a schematic diagram showing the unwrapped phase map relating to the height distribution on the surface of the object after phase unwrapping the wrapped phase map of FIG. 4E.

After the hue phase-shifting information is obtained, step 26 of FIG. 1 is performed for obtaining the corresponding height distribution associated with the object from the hue phase-shifting information. In step 26, a phase restoring (unwrapping) method, but should not be limited to be, proposed by Goldstein is adapted to obtain continuous hue phase-shifts relating to the height variation of the object's surface, as the one shown in FIG. 4F. The relationship between the $\Delta H$ and the corresponding height with respect to the surface height of the object can be represented as formula (25) by substituting $$\overline{CD} = \frac{\Delta H}{Hf_0}$$

derived from formula (23) into formula (24).

$$h = \frac{\frac{\Delta H}{Hf_0} l}{\frac{\Delta H}{Hf_0} + d} = \frac{\Delta H l}{\Delta H + Hf_0 d} \quad (25)$$

As in most cases that $Hf_0 \gg \Delta H$, then equation (25) can be further simplified and represented as formula (26), wherein, $$\frac{l}{Hf_0 d}$$

is a constant and $\Delta H$ is a variable. Therefore, the height variation of the object can be obtained according to the variation of $\Delta H$. After the obtaining the formula (26) relating to the height h of the surface height of object, the flow proceeds to step 27 of FIG. 3 for reconstructing the surface profile of the object, as the one shown in FIG. 4G.

$$h = \frac{\Delta H l}{\Delta H + Hf_0 d} \approx \frac{\Delta H l}{Hf_0 d} = \Delta H \frac{l}{Hf_0 d} \quad (26)$$

Figure 9A:
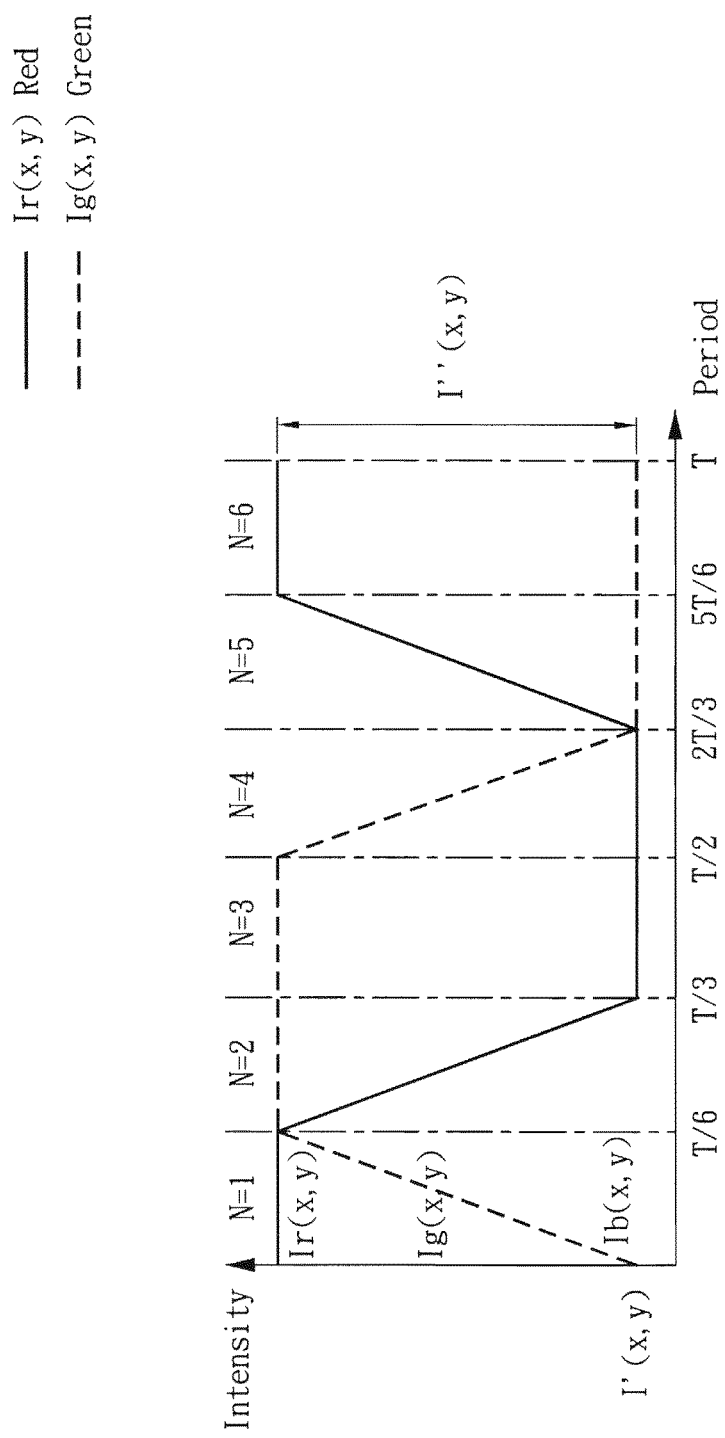
FIG. 9A and FIG. 9B is a schematic diagram showing another color structured light intensity pattern encoded with other types of color fringe patterns according to the present invention.

The previous embodiment of the present invention is related to a color structured light composed of three primary color lights with continuous hue variation respectively. In another embodiment shown in FIG. 9A, the color structured light is composed of two primary color lights, i.e. red and green, as each primary color light has continuous hue variation. Accordingly, the equation for describing the model with respect to the structured light formed by two primary color lights is represented as formula (27).

$$I_y(x, y) = \begin{cases} 1 & x \in [0, T/6) \text{ or } [5T/6, T) \\ (2 - 6x/T) & x \in [T/6, T/3) \\ 0 & x \in [T/3, 2T/3) \\ (6x/T - 4); & x \in [2T/3, 5T/6) \end{cases} \quad (27)$$

$$I_g(x, y) = \begin{cases} (6x/T) & x \in [0, T/6) \\ 1 & x \in [T/6, T/2) \\ (4 - 6x/T) & x \in [T/3, 2T/3) \\ 0 & x \in [2T/3, T) \end{cases}$$

Figure 9B:
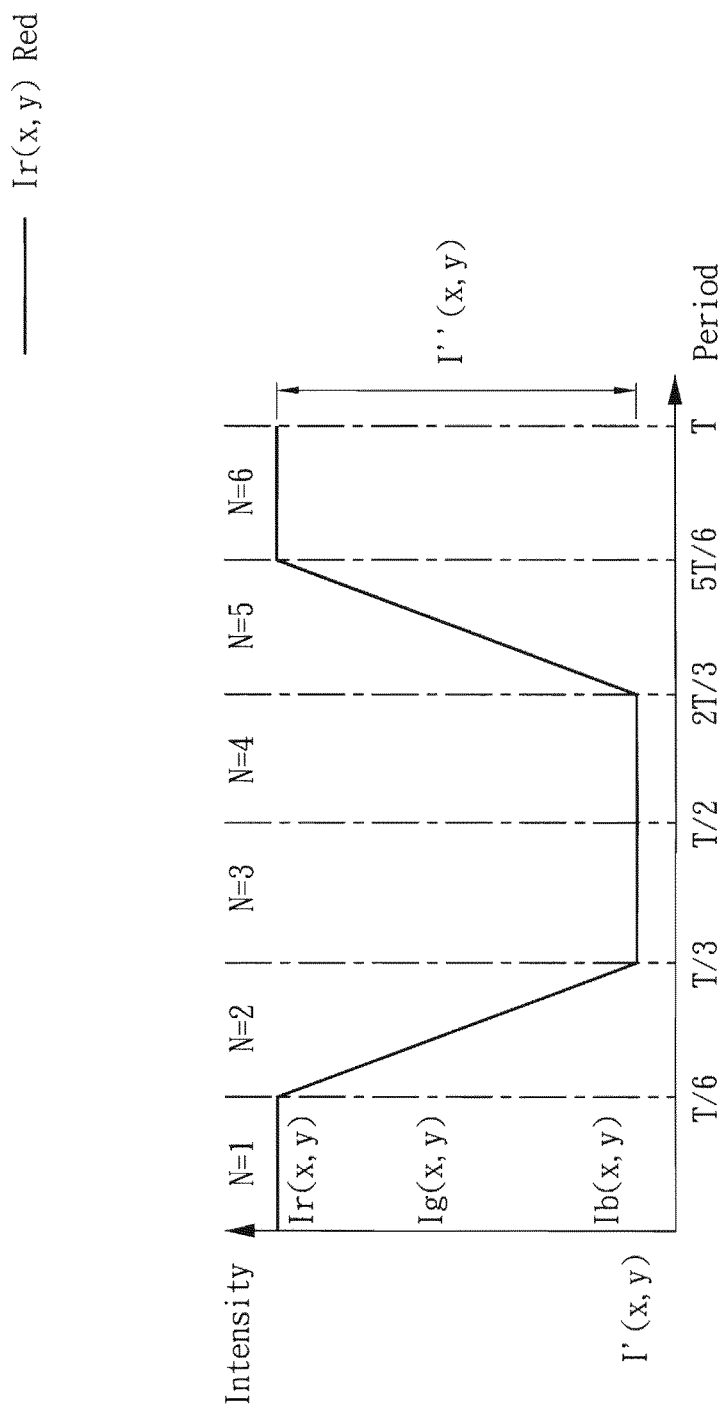

It is noted that the color structured light shown in FIG. 9B refers to a single primary color light, which is red primary light in the embodiment, having a continuous hue variation, wherein the corresponding formula for describing the single color structured light is shown as formula (28).

$$I_y(x, y) = \begin{cases} 1 & x \in [0, T/6) \text{ or } [5T/6, T) \\ (2 - 6x/T) & x \in [T/6, T/3) \\ 0 & x \in [T/3, 2T/3) \\ (6x/T - 4); & x \in [2T/3, 5T/6) \end{cases} \quad (28)$$

Figure 10:
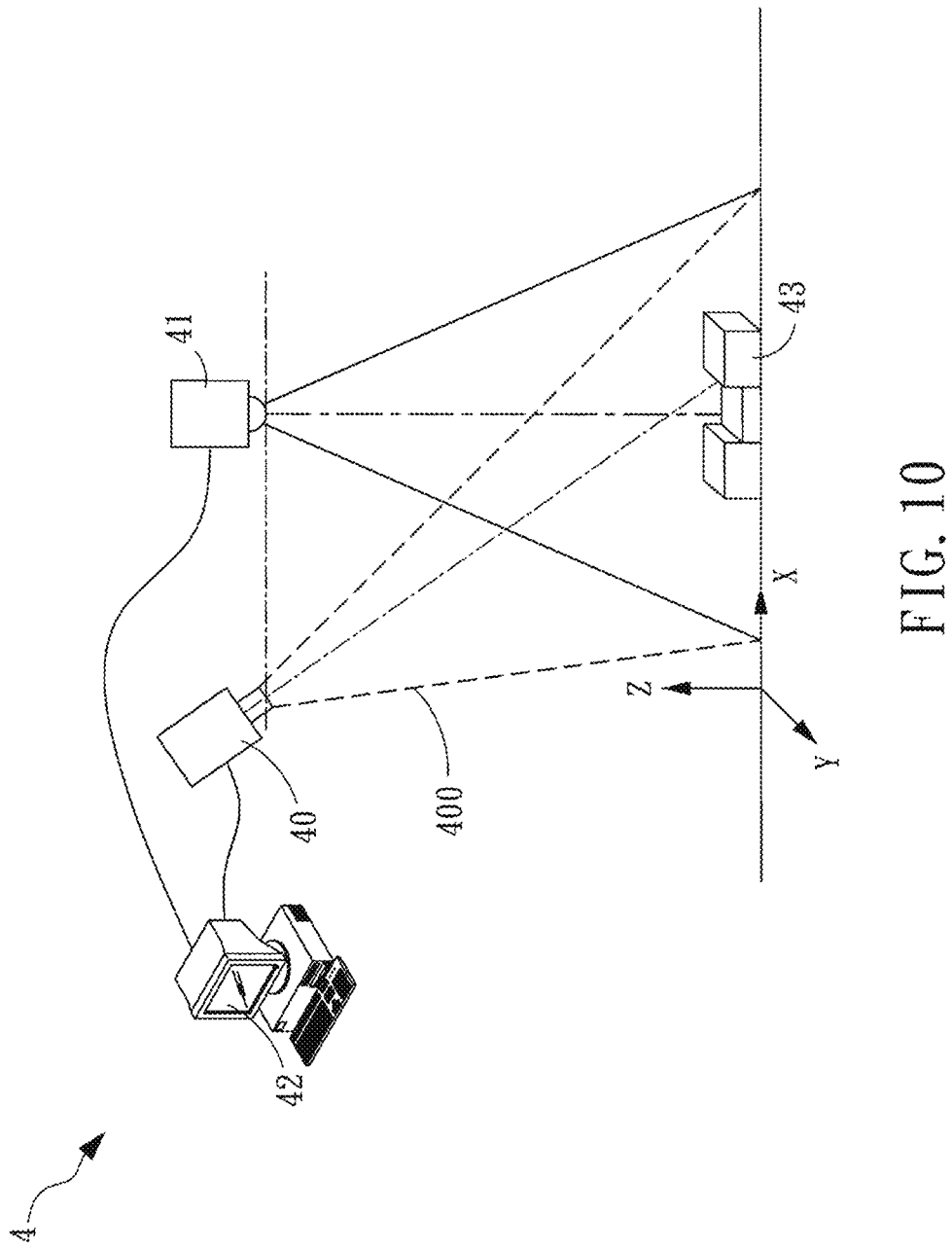
FIG. 10 illustrates an embodiment of a system for 3-D surface profilometry according to the present invention.
Figure 11:
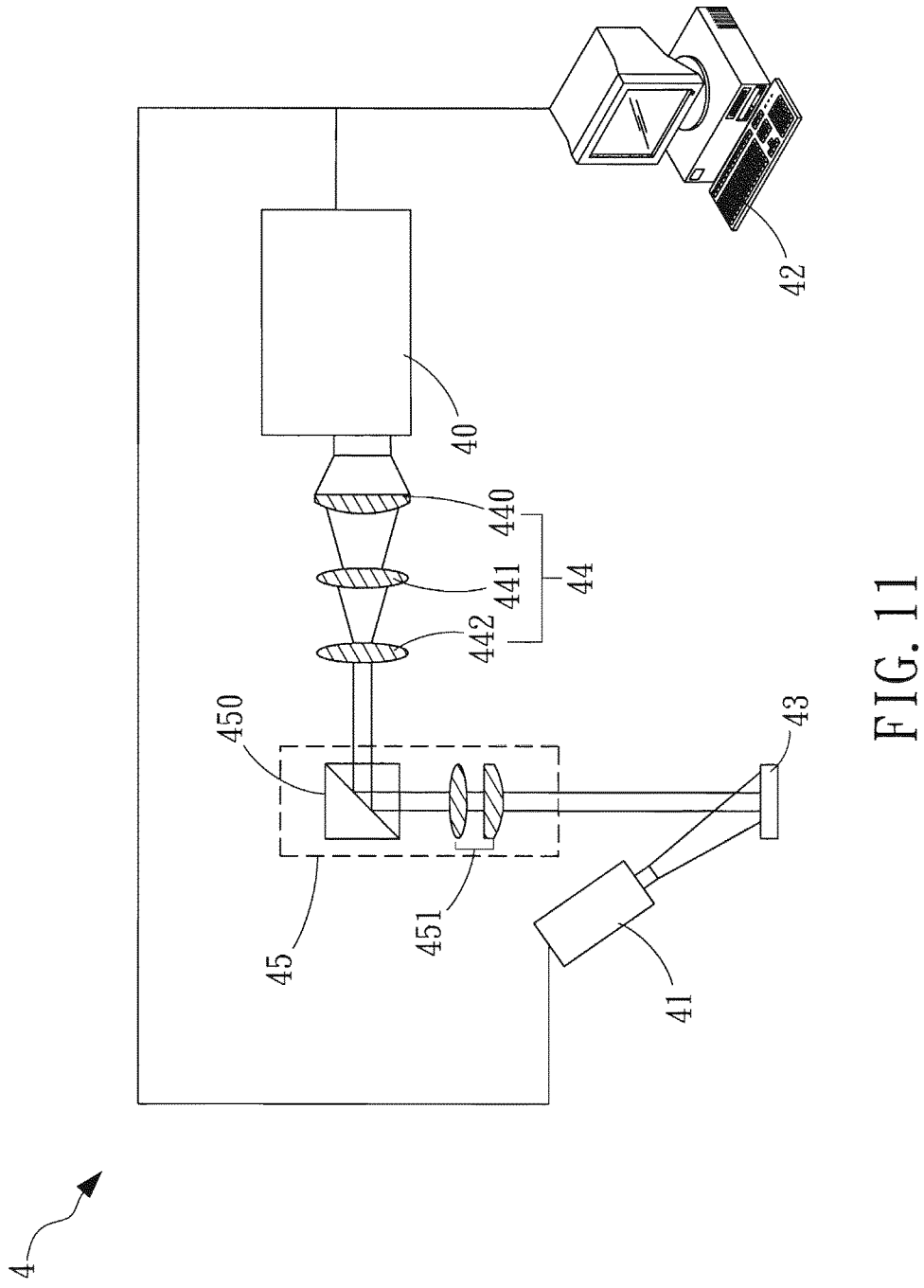
FIG. 11 is a schematic diagram showing another embodiment of a system for 3-D surface profilometry of the present invention.

Please refer to FIG. 10, which illustrates a system for 3-D surface profilometry according to an embodiment of the invention. In the present embodiment, the system 4 comprises a light source 40, an image acquiring unit 41 and a processing unit 42. The light source 40 is adapted to provide a color structured light, which has a trapezoidal fringe pattern composed of R, G, and B primary color lights, wherein each of the two primary color lights have a phase difference, $2\pi/3$ in the present embodiment, therebetween. The color structured light is the same as the foregoing description, which will not be described hereinafter. In the present embodiment, the light source 40 is a DLP device for providing the color structured light. As illustrated in FIG. 11, a lens module 44 is adapted to combine with the light source for modulating the emitting light from the light source into a collimating light so that the projected color structured light will not affect the definition of the fringe patterns of the color structured light due to the distance variation between the light source and the object. The lens module 44 used in this embodiment includes, but should not be limited to, a combination of a plain-convex lens 440 and two double-convex lens 441, and 442. The color structured light collimated by the lens module 44 is guided to the object 43 by means of another lens module 45 having a beam splitter 450 and a collimating lens 451.

Back to FIG. 10, the image acquiring unit 41 is disposed at a side of the light source 40 for acquiring a reflected color fringe light having hue phase information with respect to the surface profile of the object. The image acquiring unit 41 can include, but should not be limited to, a three-color CCD. The processing unit 42 is electrically coupled to the light source 40 and the image acquiring unit 41 for performing the color correction process of FIG. 5 to calibrate and compensate the color structured light from the light source 40 and thus uses the process of FIG. 3 to obtain a hue information from the reflected color fringe image and then transforms the hue information into a hue phase-shifting information. The processing unit further transforms the hue phase-shifting information into the surface height information of the object 43 so as to reconstruct the surface profile of the object 43.

To sum up, the present invention provides a method for simultaneous hue phase-shifting and system for 3-D surface profilometry using the same, by which a color structured light is projected on an object so as to obtain a reflected color fringe light containing the hue phase-shifting information with respect to the surface profile of the object for achieving fast 3-D surface profile reconstruction with high spatial resolution. It is noted that the present invention requires only one reflected color fringe image of the object having sufficient hue phase-shifting information for 3-D surface profile reconstruction so that not only undesired influences upon the profile reconstruction resulting from the disturbance of its ambient measuring environment can be minimized, but also the efficiency of such 3-D surface profile reconstruction is much superior to the traditional multi-step phase shifting methods.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

What is claimed is:

1. A method for simultaneous hue phase-shifting comprising the steps of:
projecting a color structured light onto an object;
acquiring a reflected color fringe image having a hue phase information with respect to the surface profile of the object projected by the reflected color structured light;
extracting a hue information from the reflected color fringe image; and
converting the hue information into a hue phase-shifting information.

2. The method of claim 1, wherein the color structured light comprises at least two primary color light components having continuous hue variation respectively, wherein each of the two primary color light components have a phase difference therebetween.

3. The method of claim 2, wherein the phase difference is $2\pi/3$.

4. The method of claim 1, wherein the color structured light is substantially a single primary color light component with continuous hue variation.

5. The method of claim 1, wherein the color structured light is encoded with a fringe pattern selected from a pattern distribution consisting of a trapezoidal fringe pattern, a sinusoidal fringe pattern, and a square-wave fringe pattern.

6. The method of claim 1, wherein a step for calibrating and compensating the color hue phase shift with respect to the color structured light is performed while providing the color structured light.

7. The method of claim 6, wherein the calibrating and compensating process for the color shift further comprises the steps of:

generating a plurality of calibration lights having calibration spectrums with gray levels corresponding to the hue distribution respectively;
projecting the plurality of calibration light sequentially onto a reference plane and acquiring the corresponding calibration images;
transforming the plurality of calibration images into HSI space and recording the corresponding hue values for establishing a lookup table associated with a relation between ideal hue values and measured hue values with respect to the calibration color spectrums respectively; and
compensating the color structured light according to the lookup table thereby forming a calibrated color structured light whose hue value is linear to the displacement along one direction in space.

8. The method of claim 1, further comprising a step for reconstructing the surface profile of the object according to the hue phase-shifting information.

9. A system for 3-D surface profilometry, comprising:
a light source, for providing a color structured light;
an image acquiring unit, for acquiring a reflected color fringe image having a hue phase information with respect to the surface profile of the object projected by the color structured light; and
a processing unit, electrically connected to the light source and the image acquiring unit, for extracting a hue information from the reflected color fringe image, and converting the hue information into a hue phase-shifting information.

10. The system of claim 9, wherein the color structured light comprises at least two primary color light components having continuous hue variation, respectively, wherein each of the two primary color light components have a phase difference therebetween.

11. The system of claim 10, wherein the phase difference is $2\pi/3$.

12. The method of claim 9 wherein the color structured light is substantially a single primary color light component with continuous hue variation.

13. The method of claim 9, wherein the color structured light is encoded with a fringe pattern selected from a group consisting of a trapezoidal fringe pattern, a sinusoidal fringe pattern, and a square-wave fringe pattern.

14. The system of claim 9, wherein the light source is a digital light processing unit.

15. The system of claim 9, wherein the image acquiring device is a three-color image acquiring device.

16. The system of claim 9, wherein the processing unit further calibrates and compensates the color shift with respect to the color structured light.

17. The system of claim 9, wherein the processing unit is enabled to perform a calculation for reconstructing the surface profile of the object according to the hue phase-shifting information.

* * * * *